United States Patent [19]
Takata

[11] 3,928,162
[45] Dec. 23, 1975

[54] GAS FLOW COULOMETRIC DETECTOR

[75] Inventor: Yoshinori Takata, Tokaimura, Japan

[73] Assignee: Hitachi, Ltd., Japan

[22] Filed: Mar. 16, 1972

[21] Appl. No.: 235,120

[30] Foreign Application Priority Data
Mar. 19, 1971 Japan.............................. 46-15146

[52] U.S. Cl. ............................ 204/195 R; 204/1 T
[51] Int. Cl.²......................................... G01N 27/46
[58] Field of Search.............. 204/1 T, 195 R, 195 P

[56] References Cited
UNITED STATES PATENTS

| | | | |
|---|---|---|---|
| 2,651,612 | 9/1953 | Haller | 204/195 R |
| 2,913,386 | 11/1959 | Clark | 204/195 P |
| 2,991,412 | 7/1961 | Kordesch | 204/195 R |
| 3,235,477 | 2/1966 | Keyser et al. | 204/195 P |
| 3,296,113 | 1/1967 | Hansen | 204/195 R |
| 3,328,204 | 6/1967 | Grubb | 204/195 R |
| 3,455,807 | 7/1969 | Jacobson et al. | 204/195 R |
| 3,756,923 | 9/1973 | Dahms | 204/1 T |
| 3,824,166 | 7/1974 | Deibert | 204/195 R |

*Primary Examiner*—T. Tung
*Attorney, Agent, or Firm*—Craig & Antonelli

[57] ABSTRACT

A gas flow coulometric detector comprising a casing filled with an electrolyte, a sample gas passage in the casing, and an operating electrode and an opposite electrode disposed within the casing. The operating electrode is disposed in such a position that it contacts at one of its surfaces with a sample gas flowing through the passage and at the other surface with the electrolyte. The opposite electrode is disposed on the side of the other surface of the operating electrode so that it contacts with the electrolyte in such a position. A predetermined voltage is applied across the operating electrode and the opposite electrode so as to electrolyse the sample gas while it flows through the passage, and the quantity of electricity produced during the electrolysis is detected to make the quantitative analysis of the sample gas.

21 Claims, 8 Drawing Figures

GAS FLOW COULOMETRIC DETECTOR

BACKGROUND OF THE INVENTION

1. Field of the Invention

This invention relates to coulometric detectors and more particularly to a gas flow coulometric detector suitable for continuously detecting electrically active gaseous substances such as oxygen, hydrogen and carbon monoxide contained in very small amounts in a gas flow within a short period of time.

2. Description of the Prior Art

Analysis of very small amounts of gaseous substances has heretofore been made by various methods including a method of measuring absorption of infrared rays, a method of measuring thermal conductivity, a method of measuring gas density, a method of measuring combustion heat, a method of measuring susceptibility, an interference method, polarography, a method of measuring electrical conductivity and a method using a galvanic cell. However, none of these conventional methods have been proved completely satisfactory for the absolute analysis of oxygen or hydrogen contained in a very small amount in a gas flow due to the poor sensitivity of measurement and troublesome calibration involved in the measurement.

Although the oxygen meter of the galvanic cell type is a relatively excellent and useful analyser which utilizes the electrochemical detection, it is defective in that a calibration curve taken on a standard sample is required, the extracted gas must be maintained at a constant pressure and temperature, and the response is relatively poor.

Coulometry is a method of absolute analysis which has a remarkably high sensitivity and precision in principle and is an especially excellent and useful method among various methods of electrochemical analysis. More precisely, coulometry is a method in which, on the basis of the assumption that an electrochemical reaction proceeds quantitatively and stoichiometrically, the number of electrons, hence the quantity of charges migrated as a result of the reaction is measured and the Faraday's law is applied to seek the result of analysis. This coulometry is classified into constant-current coulometry and constant-potential coulometry depending on whether the electrochemical reaction is carried out while maintaining the current at a constant value or while maintaining the electrode potential at a constant value.

The constant-current coulometry is a method in which electrolysis is carried out while maintaining the current constant and measurement is taken of the quantity of electricity required for the electrolysis. Typical of the constant-current coulometry is "coulometric titration" in which titration is carried out while producing a titration reagent by electrolysis. This method is advantageous in that the quantity of electricity can be easily sought by merely multiplying the value of current used in the electrolysis by the period of time required for the electrolysis, and various reaction systems can be utilized for the quantitative analysis of many substances. On the other hand, however, this method is defective in that a difficulty is encountered in selectively causing a desired reaction to take place unless special means or contrivances are provided and the automatic and precise termination of the titration to conform to the end of the reaction is not so easy compared with the constant-potential coulometry described below. It is further defective in that increased errors result when the period of time required for the electrolysis is reduced beyond a certain limit.

The constant-potential coulometry is a method in which the electrolysis is carried out while maintaining the potential of the operating electrode constant. This method is based on the principle that the reaction between an electrically active substance and electrons reaches a state of equilibrium at a certain potential which is peculiar to the specific substance. It is therefore easy to selectively cause the reaction between one of a plurality of electrically active substances and electrons in such a state that the equilibrium is transferred considerably in one direction by suitably selecting the potential. According to this method, the number of electrons liberated and accepted until the equilibrium between the desired substance and electrons is reached, hence the quantity of electricity is measured for seeking the amount of the desired substance. Thus, the separation of the desired substance and the quantitative analysis thereof can be carried out simultaneously due to the fact that the desired reaction is selectively caused to take place by setting the potential of the operating electrode at a suitable level. More precisely, this method comprises subjecting an electrically active gaseous substance in a gas flow to constant-potential electrolysis with a current efficiency as high as almost 100 percent, measuring the quantity Q of electricity appeared during the electrolysis, and applying Faraday's law to the result for seeking the content of the desired gaseous substance. The calculation can be done in the following manner:

$$Q = nFW/M \qquad (1)$$

where $n$ is the number of electrons liberated and accepted during oxidation and reduction, $F$ is the Faraday constant ($F = 96{,}487$ coulombs/chemical equivalent), $W$ is the weight of the desired gaseous substance and $M$ is the molecular weight of the substance.

By replaciing the quantity of gas by the volume $V$ (cc) in the normal state, $Q$ is given by $$Q = nFV/22400 \qquad (2)$$

When the gas containing the desired gaseous substance is a continuous fluid flow, the current $i$ which is detected by the gas flow coulometric detector is given by $$i = nFvc/22.4 \times 10^9 \qquad (3)$$

where $v$ is the flow rate of the gas in cc/sec, and $c$ is the concentration of the desired gaseous substance in ppm (V/V). Thus, the concentration of the desired gaseous substance can be sought by measuring the current $i$ detected by the detector.

SUMMARY OF THE INVENTION

It is an object of the present invention to provide a novel and improved gas flow coulometric detector capable of continuously analysing a gas.

Another object of the present invention is to provide a gas flow coulometric detector capable of directly electrolysing a gas.

A further object of the present invention is to provide a gas flow coulometric detector capable of selectively electrolysing a gas at a constant potential.

Another object of the present invention is to provide a gas flow coulometric detector which does not require a calibration curve as well as any temperature control and which is substantially free from undesirable variations in the potential during electrolysis.

Still another object of the present invention is to provide a gas flow coulometric detector having a very simple and compact construction.

In accordance with a preferred embodiment of the present invention, there is provided a gas flow coulometric detector comprising a casing filled with an electrolyte, means for defining a sample gas passage within said casing, means for flowing a sample gas through said passage, a porous operating electrode having a first surface in contact with said sample gas flowing through said passage, a second surface in contact with said electrolyte, and many pores serving as communication means between said two surfaces, a counter electrode disposed opposite to said operating electrode on the side of said second surface of said operating electrode in parallel with said second surface so as to be in contact with said electrolyte, means for applying a predetermined voltage across said operating electrode and said opposite electrode so that electrolysis can be carried out due to the contact between said electrolyte and said sample gas in said pores, and means for detecting the quantity of electricity appearing during said electrolysis. Said porous operating electrode has such a property that it inhibits undesirable permeation of said electrolyte from said second surface to said first surface through said pores.

Other objects, features and advantages of the present invention will be apparent from the following detailed description taken in conjunction with the accompanying drawing.

DESCRIPTION OF THE PREFERRED EMBODIMENTS

Figure 1:
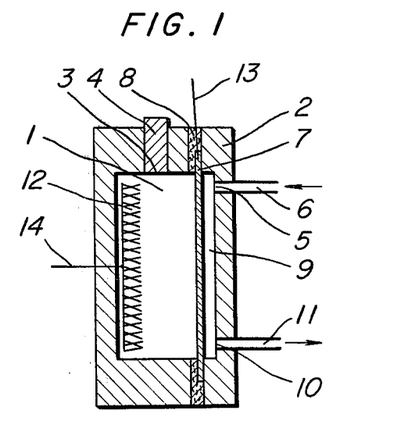
FIG. 1 is a schematic longitudinal section of an embodiment of the gas flow coulometric detector according to the present invention.

Referring to FIG. 1 showing an embodiment of the present invention, a gas flow coulometric detector comprises a casing 2 filled with an electrolyte 1 such as an aqueous solution of potassium chloride. An electrolyte filling port 3 is provided on the upper end of the casing 2 for filling the electrolyte 1 into the casing 2. The filling port 3 is normally closed by a plug 4 which hermetically seals the filling port 3 so as to prevent the electrolyte 1 from communicating with external air. A sample gas to be analysed is admitted through an admission port 5 provided at a suitable position near the upper end of the casing 2. A sample gas supply conduit 6 is connected to the sample gas admission port 5. An operating electrode 7 is disposed within the casing 2. In this embodiment, the operating electrode 7 is a porous electrode in flat sheet form made by hot-pressing a mixture of powdery carbon, platinum black and teflon on a fine meshed structure of nickel so that it has many pores on the opposite surfaces thereof. However, the porous operating electrode 7 has such a property that it inhibits undesirable permeation of the electrolyte 1 from one of the surfaces to the opposite surface through the pores. This electrode 7 may have a cylindrical shape when so desired. In order to prevent the operating electrode 7 from communicating with external air, a packing 8 is mounted in the casing 2 in intimate contact with the end portions of the operating electrode 7. A sample gas passage 9 is defined within the casing 2 between the operating electrode 7 and the inner wall of the casing 2, and the volume of the sample gas passage 9 is selected to be small compared with the surface area of the operating electrode 7 so that the sample gas supplied by way of the sample gas supply conduit 6 can be uniformly and thoroughly brought into contact with the gas-contacting surface of the operating electrode 7 and the response speed of the reaction can be accelerated thereby. A sample gas discharge port 10 is disposed at a suitable position near the lower end of the casing 2 so as to discharge the sample gas subjected to analysis externally to the detector by way of a sample gas discharge conduit 11 connected thereto. A counter electrode 12 is disposed within the casing 2 opposite to the operating electrode 7. The opposite or counter 12 is in the form of a silver net or more precisely a fine meshed structure of Ag-AgCl having meshed surfaces of large surface area so that polarization is difficult to occur. Alternatively, the opposite electrode 12 may consist of a mesh of Hg-$Hg_2Cl_2$, Ag-AgBr, Ag-AgI or the like. The opposite electrode 12 is disposed in parallel with such surface of the operating electrode 7 with which the operating electrode 7 is in contact with the electrolyte 1 so that the entire surface of the opposite electrode 12 is in contact with the electrolyte 1. A pair of leads 13 and 14 extend from the operating electrode 7 and opposite electrode 12 to be connected with respective terminals 13' and 14' in a circuit shown in FIG. 2.

Figure 2:
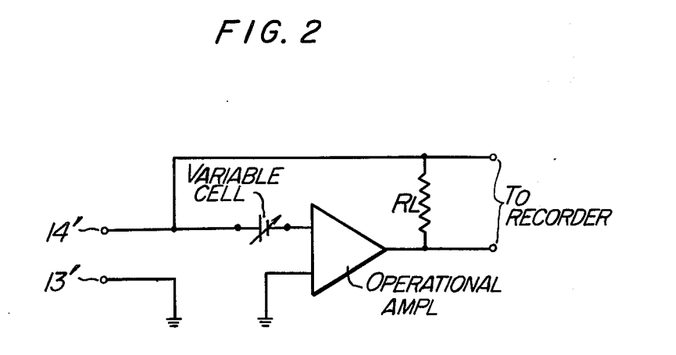
FIG. 2 is a diagram of an electrical circuit preferably used with the gas flow coulometric detector shown in FIG. 1.

Referring to FIG. 2, the terminal 13' connected to the operating electrode 7 by the lead 13 is grounded as shown. The terminal 14' connected to the opposite electrode 12 by the lead 14 is connected to an output terminal of the circuit to be connected to one of the input terminals of a recorder, ammeter or coulometer (not shown). The terminal 14' is further connected to an operational amplifier through a variable cell. The operational amplifier is grounded and its output terminal is connected to the other input terminal of the recorder, ammeter or coulometer (not shown) as another output terminal of the circuit. A resistor $R_L$ is connected across the output terminal connected to the terminal 14' and the output terminal of the operational amplifier.

The operation of the detector having the structure above described will now be described in detail, with reference to the selective quantitative analysis of, for example, oxygen gas contained in a very small amount in a sample gas.

For the purpose of the selective quantitative analysis of oxygen gas contained in a very small amount in a sample gas, it is necessary to previously apply a constant voltage suitable for the selective quantitative analysis of the oxygen gas across the operating electrode 7 and the opposite electrode 12. In this embodiment, the value of the voltage preferably applied across these electrodes is 0.6 volt. To this end, the voltage of the variable cell shown in FIG. 2 is set at −0.6 volt for establishing a potential difference of 0.6 volt between the operating electrode 7 and the opposite electrode 12. After applying the voltage across the operating electrode 7 and the opposite electrode 12, a sample gas, for example, helium gas containing a very small amount of oxygen gas to be analysed is introduced at a flow rate of 20 ml/min into the gas passage 9 from the sample gas admission port 5 by way of the sample gas supply conduit 6 shown in FIG. 1. The sample gas introduced into the gas passage 9 is distributed uniformly over the corresponding surface of the operating electrode 7 and is brought into contact with this surface as if it licks such surface. The surfaces of the operating electrode 7 are porous and include many pores since the electrode 7 is made by a method as above described. Further, these surfaces are subjected to a water-repellent treatment so that the electrolyte may not permeate through the pores to the surface on the side of the gas passage 9. Thus, the helium gas permeates from the surface on the side of the gas passage 9 inwardly into the operating electrode 7 through the pores. On the other hand, the electrolyte 1 stays in the pore portions adjacent to the surface of the operating electrode 7 on the side of the electrolyte 1 due to the water-repellent treatment applied to the operating electrode 7 and cannot reach the surface of the operating electrode 7 on the side of the gas passage 9 through the pores. Therefore, the helium gas containing the oxygen gas to be analysed, the electrolyte 1 and the material of the operating electrode 7 are in contact with one another at the interior or pore portions of the operating electrode 7. Thus, the following reaction takes place at the portions where the helium gas, electrolyte and electrode material are in contact with one another:

$$O_2 + 2H_2O + 4e \rightarrow 4OH^-$$

4 where $O_2$ is the molecule of oxygen contained in a very small amount in the helium gas, $H_2O$ is the molecule of water in the electrolyte or aqueous solution of potassium chloride, and e is the electron supplied from the opposite electrode 12 to the operating electrode 7 by way of the leads 14 and 13.

The above reaction results in an increase in the $OH^-$ (hydroxyl) ions in the electrolyte 1. However, due to the fact that potassium chloride KCl used as the electrolyte 1 is ionized into the $K^+$ (potassium) ions and $Cl^-$ (chlorine) ions, the $K^+$ ions combine with the $OH^-$ ions to form the molecules of potassium hydroxide KOH. On the other hand, the $Cl^-$ ions combine with Ag in the fine meshed structure of Ag-AgCl (silver-silver chloride) used as the opposite electrode 12, and the reaction shown by the following electrochemical reaction formula $$Ag + Cl^- \rightarrow AgCl + e$$

5 takes place thereby producing silver chloride AgCl and liberating the electrons e. The silver chloride AgCl thus formed deposits on the fine meshed structure forming the opposite electrode 12, while the electrons e migrate through the lead 14 extending from the opposite electrode 12 and through the lead 13 toward the operating electrode 7 to participate in the reaction shown in formula (4).

The quantity of electricity migrated from the operating electrode 7 toward the opposite electrode 12 or the magnitude of current that flows during electrolysis due to the above reaction is derived as an iR drop across the output terminals shown in FIG. 2 and this is detected by the recorder, ammeter or coulometer (not shown). Thus, the weight, volume or concentration of the oxygen gas contained in a very small amount in the helium gas can be determined on the basis of the equation (1), (2) or (3) respectively.

In this manner, while the sample gas containing oxygen gas in a very small amount passes through the gas passage 9, the content of the desired gas or oxygen in the sample gas can be detected by the detector and any other gases which do not participate in the above reaction are discharged out of the detector by way of the sample gas discharge conduit 11 from the sample gas discharge port 10.

It will be understood from the above description that, according to one embodiment of the present invention, a desired gas contained in a sample gas can be detected directly, continuously and within a short period of time by merely continuously supplying the sample gas from the sample gas supply conduit 6 into the gas passage 9 through the sample gas admission port 5. Further, by suitably selecting the value of the voltage to be applied across the operating electrode 7 and the opposite electrode 12 depending on the gas to be analysed, selective quantitative analysis of electrically active gases including not only oxygen but also hydrogen, carbon monoxide and other gases can be successively carried out. The present invention is further advantageous in that the detector is substantially free from undesirable variations in the potential difference between the operating electrode 7 and the opposite electrode 12 tending to occur frequently during electrolysis by virtue of the fact that the opposite electrode 12 is in fine meshed form and thus has a large surface area and that the opposite electrode 12 is formed from a combination of hardly polarized materials such as Ag-AgCl. Furthermore, the present invention is advantageous in that the detector has a very compact construction and can satisfactorily operate without requiring any calibration curve and temperature control which have been required in conventional detectors of this kind.

Figure 3:
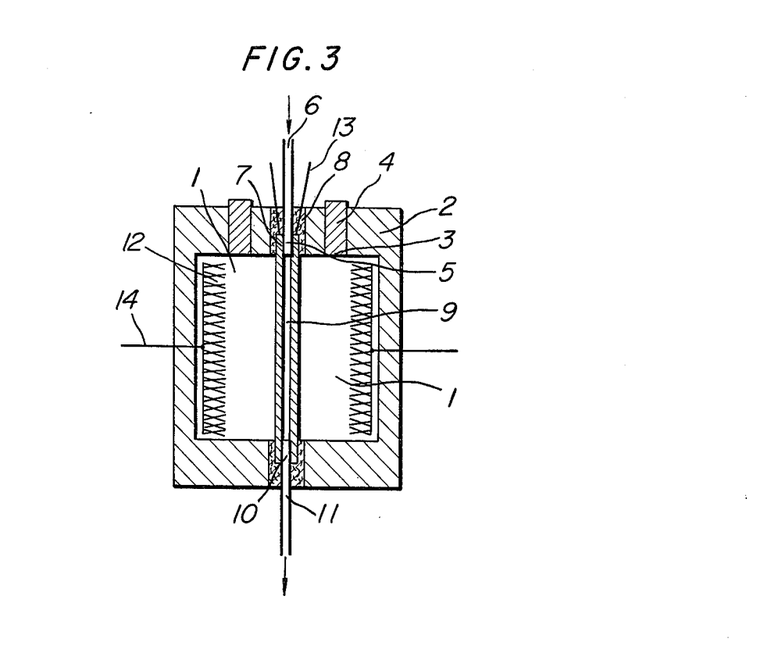
FIG. 3 is a schematic longitudinal section of another embodiment of the present invention.

FIG. 3 is a longitudinal section of another embodiment of the present invention. In FIG. 3, like reference numerals are used to denote like parts appearing in FIG. 1. The function and operation of the parts designated by the reference numerals 1 to 14 in FIG. 3 are the same as those described with reference to FIG. 1 and any detailed description is unnecessary. The detector shown in FIG. 3 is constructed so that a pair of substantially parallel operating electrodes 7 of the kind described with reference to FIG. 1 are disposed on opposite sides of a gas passage 9. Thus, the area with which the operating electrodes 7 are in contact with a sample gas is at least two times that shown in FIG. 1 and the ability of analysing a desired gas can be at least doubled.

Figure 4:
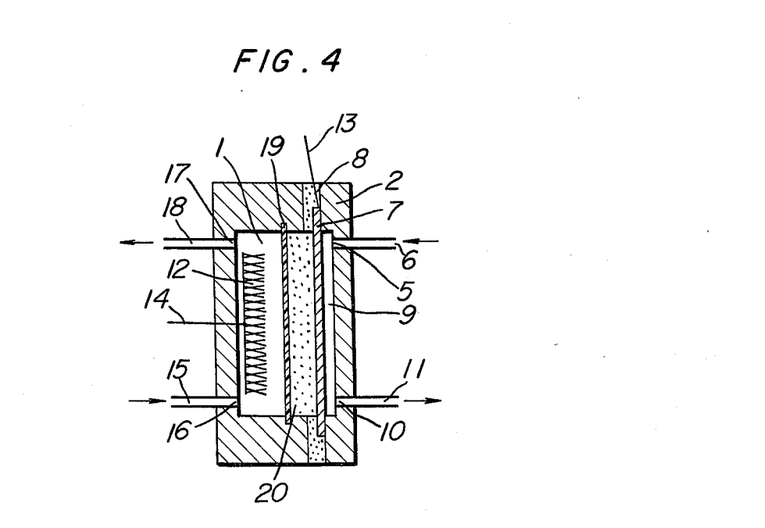
FIG. 4 is a schematic longitudinal section of a further embodiment of the present invention.

FIG. 4 is a longitudinal section of a further embodiment of the present invention in which like reference numerals are used to denote like parts appearing in FIG. 1. The function and operation of the parts designated by the reference numerals 1, 2 and 5 to 14 are the same as those described with reference to FIG. 1 and any detailed description is unnecessary. In FIG. 4, an electrolyte 1 of the kind described with reference to FIG. 1 is supplied into a casing 2 by way of an electrolyte supply conduit 15. The electrolyte supply conduit is connected at one end thereof to an oxygen removing means (not shown), which removes oxygen in the electrolyte 1 prior to supply into the casing 2, and at the other end thereof to an electrolyte admission port 16 provided in the lower portion of the casing 2 adjacent to the lower end of an opposite electrode 12 of the kind described with reference to FIG. 1. An electrolyte discharge port 17 is provided in the upper portion of the casing 2 adjacent to the upper end of the opposite electrode 12. An electrolyte discharge conduit 18 is connected at one end thereof to the electrolyte discharge port 17 and at the other end thereof to a waste liquid reservoir (not shown). An ion exchange membrane 19 is interposed between the opposite electrode 12 and an operating electrode 7 of the kind described with reference to FIG. 1 within the casing 2 filled with the electrolyte 1. A filler 20 in the form of gel fills the space between the ion exchange membrane 19 and the operating electrode 7. The filler 20 used in this embodiment is obtained by boiling a mixture of an aqueous solution of potassium chloride and agar-agar and then cooling the mixture.

The operation of the detector having such a construction will be described while placing emphasis on the portions different from those described with reference to FIG. 1.

The electrolyte 1, from which oxygen is removed by the oxygen removing means (not shown), is fed by a pump (not shown) to be continuously supplied by way of the electrolyte supply conduit 15 and the electrolyte admission port 16 into the casing 2, and the electrolyte 1 flows through the interior of the casing 2 to be continuously discharged by way of the electrolyte discharge conduit 18 from the electrolyte discharge port 17. A predetermined voltage which is most suitable for the selective quantitative analysis of a desired gas contained in a sample gas is applied across the operating electrode 7 and the opposite electrode 12 by way of respective leads 13 and 14.

After applying the predetermined voltage across these electrodes 7 and 12, a sample gas containing a desired gas such as oxygen gas in a very small amount is supplied by way of a sample gas supply conduit 6 and a sample gas admission port 5 into a gas passage 9 to bring the sample gas into contact with one surface of the operating electrode 7 so that the gas permeates from that surface into the interior of the operating electrode 7 through the pores in a manner as previously described. On the other hand, the surface of the operating electrode 7 on the side of the electrolyte 1 is in contact with the filler 20 in gel form so that water contained in the filler 20 exudes from the filler 20 toward the surface of the operating electrode 7 and accumulates in the pore portions adjacent to that surface of the operating electrode 7. As a result, the water, the oxygen gas and the material of the operating electrode 7 are in contact with one another in the pore portions as previously described, and the reaction shown by the reaction formula (4) takes place to electrolyse the oxygen gas. On the other hand, the $Cl^-$ ions in the electrolyte 1 combine with Ag in the fine meshed structure of Ag-AgCl forming the opposite electrode 12 so that AgCl is produced and electrons e are liberated by the reaction shown by the reaction formula (5) as in the embodiment described with reference to FIG. 1. However, a portion of silver forming the opposite electrode 12 may be dissolved in the electrolyte 1 to produce $Ag^+$ ions and may deposit on the operating electrode 7. In this case, the reaction occurs on the operating electrode 7. Due to the fact that this reaction proceeds in the same direction as the reaction shown by the reaction formula (4), a dark current flows between the operating electrode 7 and the opposite electrode 12 thereby giving rise to a background level. The present embodiment eliminates such a problem by interposing the ion exchange membrane 19 and the filler 20 in gel form between the opposite electrode 12 and the operating electrode 7 thereby preventing any $Ag^+$ ions existing in the electrolyte 1 from reaching the operating electrode. It is needless to say that the effect similar to that above described can be attained by employing either the ion exchange membrane 19 or the filler 20 in gel form instead of using both.

In the embodiment shown in FIG. 1, a closed structure is employed in order to prevent the electrolyte 1 from communicating with external air. Due to the closed structure, the $OH^-$ ions in the electrolyte 1 may increase excessively due to the reaction shown by the reaction formula (4) when the detector is used over an extended period of time and the electrolyte 1 may turn into a basic solution, resulting in the deterioration of the electrolyte. The present embodiment eliminates such a problem by continuously circulating the electrolyte through the casing 2 and supplying the electrolyte 1 into the casing 2 after removing any oxygen remaining dissolved in the electrolyte 1 by the oxygen removing means (not shown).

As will be understood from the above description, the embodiment shown in FIG. 4 is advantageous in that the electrolyte 1 is not deteriorated even after the use over a long period of time by virtue of the fact that the electrolyte 1 free from any residual oxygen is continuously circulated through the casing 2. Further, in order to prevent undesirable deposition on the operating electrode 7 of the $Ag^+$ ions in the electrolyte 1 produced by the dissolution of a portion of silver in the fine meshed structure of Ag-AgCl constituting the opposite electrode 12, the ion exchange membrane 19 and/or the filler 20 in gel form are interposed between the operating electrode 7 and the opposite electrode 12. This arrangement provides another advantage in that background can thereby be eliminated. While the present embodiment has been described with reference to the case in which the operating electrode 7 is in flat form, it will be understood that this electrode 7 may be cylindrical in shape to attain the same effect.

Figure 5:
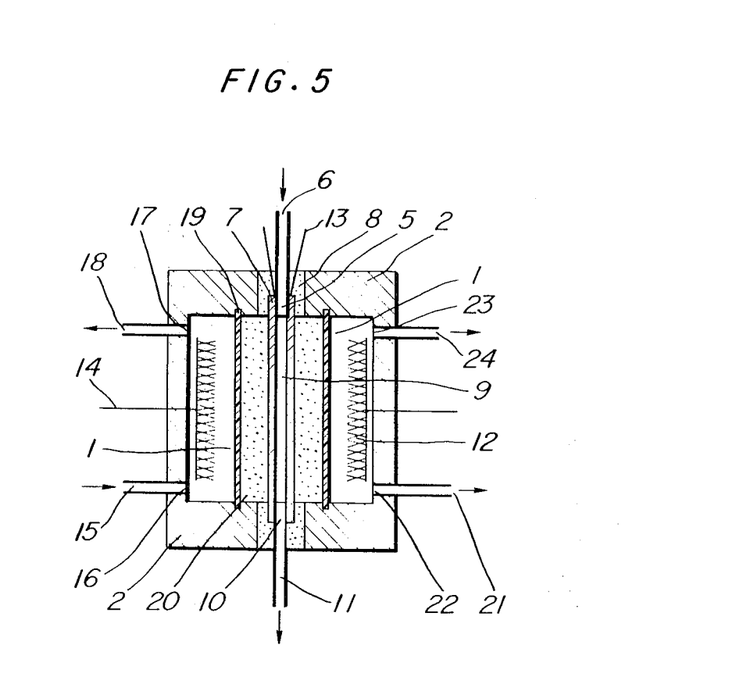
FIG. 5 is a schematic longitudinal section of another embodiment of the present invention.

FIG. 5 is a longitudinal section of another embodiment of the present invention in which like reference numerals are used to denote like parts appearing in FIG. 4. The function and operation of the parts designated by the reference numerals 1, 2 and 5 to 20 are the same as those described with reference to FIG. 4 and any detailed description is unnecessary. The construction of the detector will be described while placing emphasis on newly added parts.

An electrolyte supply conduit 21 is connected at one end thereof to an electrolyte discharge conduit 18 by a conduit (not shown) and at the other end thereof to an electrolyte admission port 22 provided in the lower portion of a casing 2. An electrolyte discharge port 23 is provided in the upper portion of the casing 2 so as to discharge the electrolyte 1 supplied by way of the electrolyte admission port 22 to a waste liquid reservoir (not shown) by way of an electrolyte discharge conduit 24.

In operation, the electrolyte 1 having residual oxygen removed by an oxygen removing means (not shown) is supplied by way of an electrolyte supply conduit 15 and an electrolyte admission port 16 into the casing 2, and after being passed through the casing 2, it is discharged by way of an electrolyte discharge port 17 and an electrolyte discharge conduit 18. Further, the electrolyte 1 discharged from the casing 2 is supplied to the electrolyte supply conduit 21 by way of the conduit (not shown) to be fed into the casing 2 from the electrolyte admission port 22, and after being passed through the casing 2, it is discharged by way of the electrolyte discharge port 23 and the electrolyte discharge conduit 24. In this manner, the electrolyte 1 is continuously circulated through the casing 2. A pair of closely spaced operating electrodes 7 of the kind described with reference to FIG. 1 are disposed in substantially parallel relation to define a gas passage 9 therebetween, and each operating electrode 7 is opposed by an opposite electrode 12 of the kind described with reference to FIG. 1 with an ion exchange membrane 19 and a filler 20 in gel form interposed therebetween. A predetermined voltage which is most suitable for the selective quantitative analysis of a desired gas contained in a sample gas is applied across each pair of the operating electrode 7 and the opposite electrode 12 by way of respective leads 13 and 14.

After applying the predetermined voltage across each pair of the electrodes 7 and 12, a sample gas containing a gas to be analysed is continuously supplied by way of a sample gas supply conduit 6 and a sample gas admission port 5 into the gas passage 9 so that the sample gas is brought into contact with the inner surface of the two operating electrodes 7 and permeates into the interior of the operating electrodes 7 through the pores existing on the surface. As a result, the reaction shown by the reaction formula (4) previously described takes place in each operating electrode 7 thereby electrolysing the desired gas contained in the sample gas. The quantitative analysis of the desired gas can be attained in a manner as previously described by detecting the quantity of electricity or current flowing from the operating electrodes 7 toward the opposite electrodes 12.

The embodiment of the present invention shown in FIG. 5, which is arranged to continuously circulate the electrolyte 1 through the casing 2, is advantageous in that the electrolyte 1 need not be replaced by a fresh electrolyte and is not deteriorated even after use over a long period of time and any residual oxygen tending to exist in the electrolyte 1 can be completely removed by the oxygen removing means (not shown). Further, the interposition of the ion exchange membrane 19 and the filler 20 in gel form between each pair of the electrodes 7 and 12 within the casing 2 for the purpose of arresting any ions adversely affecting the measurement provides another advantage in that background current can thereby be eliminated. Furthermore, the disposition of the two operating electrodes 7 in closely spaced substantially parallel relation within the casing 2 provides a further advantage in that the analysing capacity can be at least doubled compared with the provision of only one operating electrode 7.

Figure 6:
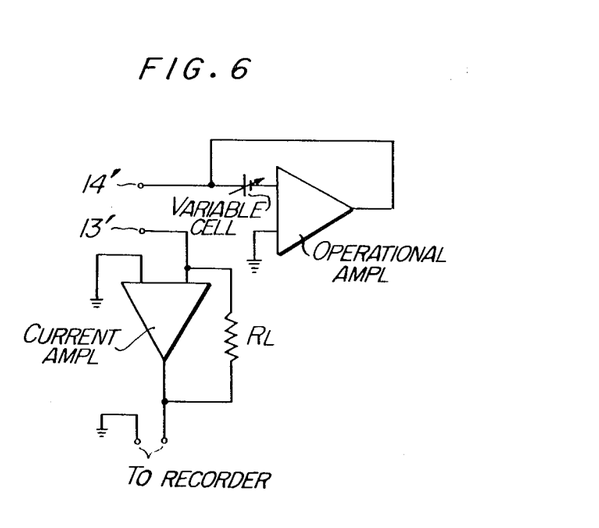
FIG. 6 is a view similar to FIG. 2 but showing another form of the electrical circuit preferably used with the gas flow coulometric detector of the present invention.

FIG. 6 shows another form of the circuit preferably used with the gas flow coulometric detector according to the present invention. The circuit shown in FIG. 6 operates on the same principle as that of the circuit shown in FIG. 2, but it differs from the latter in that there are two amplifiers, one of which is a current amplifier, and a current flowing between the operating electrode 7 and the opposite electrode 12 is supplied to the recorder through this current amplifier. The circuit shown in FIG. 6 is advantageous over the circuit shown in FIG. 2 in that less noise appears due to the fact that one of the output terminals is grounded.

Figure 7:
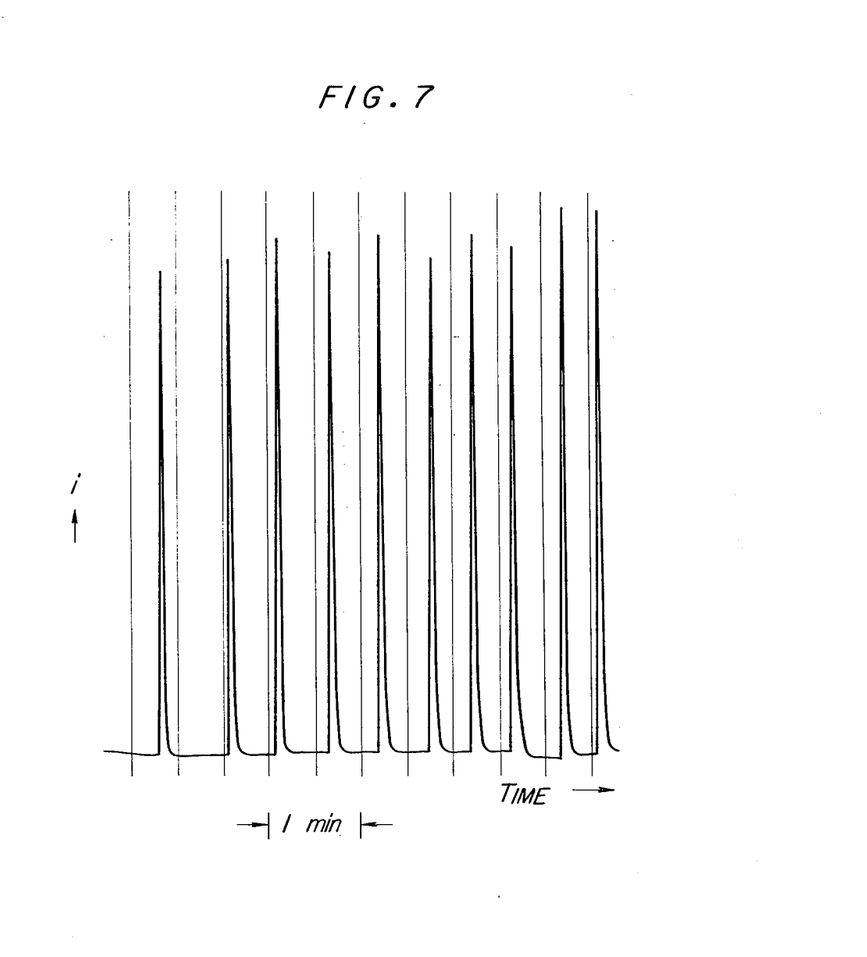
FIG. 7 is a graph showing by way of example the response speed of the gas flow coulometric detector according to the present invention.

FIG. 7 is a graph showing the response speed of the gas flow coulometric detector according to the present invention FIG. 7 shows the result of measurement when a sample gas, for example, helium gas is introduced into the gas passage 9 at a flow rate of 18.75 ml/min followed by a shot of injection of air of 1 $\mu l$ by means of a microsyringe to thereby electrolyse oxygen contained in 1 $\mu l$ of air while applying a voltage of 0.6 volt across the operating electrode 7 and the opposite electrode 12. In FIG. 7, the vertical axis represents the value of current flowing between the operating electrode 7 and the opposite electrode 12 and the horizontal axis represent time.

Figure 8:
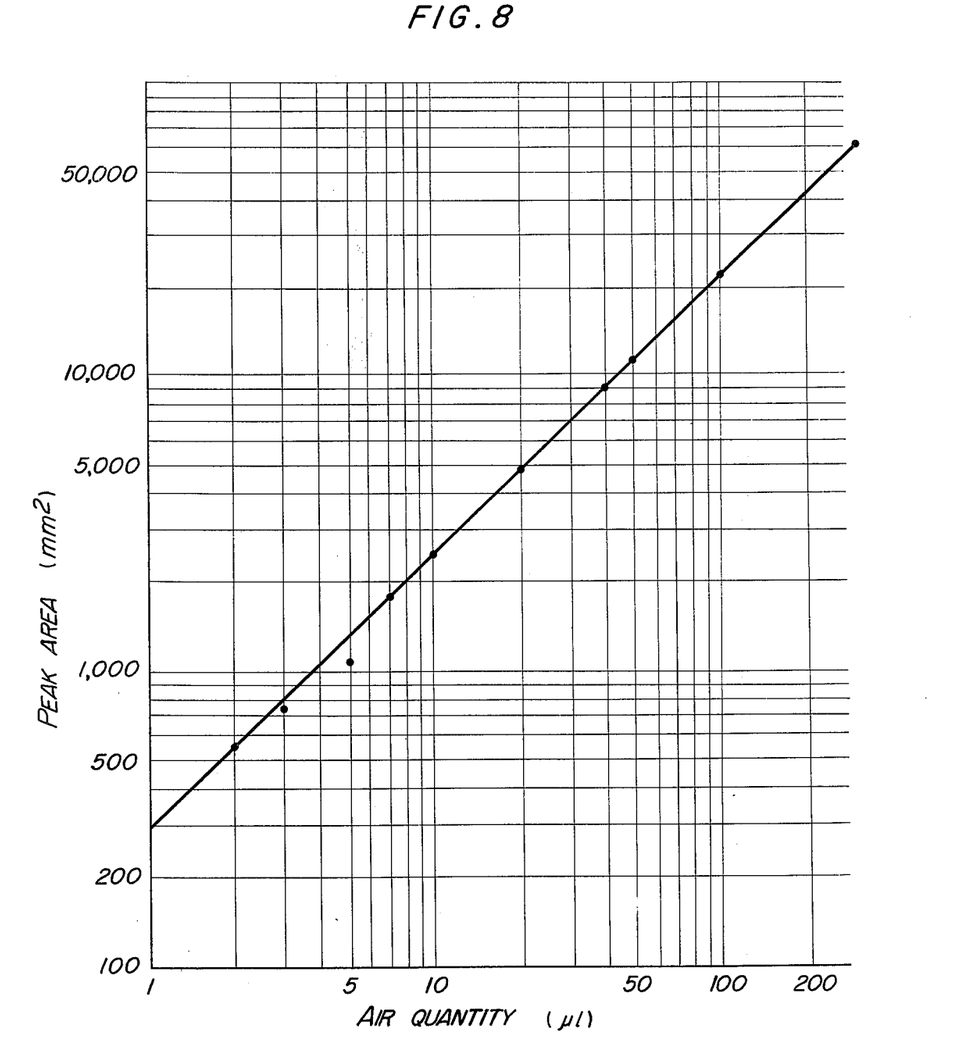
FIG. 8 is a graph showing by way of example the linearity of the gas flow coulometric detector according to the present invention.

FIG. 8 is a graph showing the linearity of the gas flow coulometric detector according to the present invention. In FIG. 8, the vertical axis represents the peak area, hence the quantity of electricity obtained by integrating the current value shown in FIG. 7 with respect to time, and the horizontal axis represents the quantity of air in $\mu l$ contained in helium gas.

As will be apparent from the foregoing description referring to some embodiments of the present invention, the present invention provides many advantages as follows:

1. Any desired gas contained in a sample gas can be detected directly and continuously within a short period of time due to the fact that the detector is of the gas flow type.
2. Any desired reaction can be selectively caused to proceed by suitably selecting the voltage applied across the operating electrode and the opposite electrode. Thus, the selective quantitative analysis of the desired gas can be very easily carried out.
3. The desired gas is directly subjected to electrolysis and the quantity of electricity that flows during the electrolysis is measured for detecting the content of the desired gas. Thus, neither a calibration curve nor temperature control is required.
4. Analysis of gas can be carried out with high sensitivity and precision in spite of a simple construction.

I claim:

1. A gas flow coulometric detector driven with a predetermined constant voltage comprising a casing filled with an electrolyte, means for defining a sample gas passage within said casing, means for flowing a sample gas through said passage, said means for defining said sample gas passage including a porous operating electrode having a first surface in contact with said sample gas flowing through said passage, a second surface in contact with said electrolyte, and many pores providing communication means between said two surfaces, said porous operating electrode having the property that it inhibits undesirable permeation of said electrolyte from said second surface to said first surface through said pores, a counter electrode spaced from and disposed opposite to said operating electrode in said casing on the side of said second surface of said operating electrode so as to be in contact with said electrolyte, said counter electrode having a surface parallel to the second surface of said operating electrode, said counter electrode being made of a material selected from the group consisting of Ag-AgCl, Hg-Hg$_2$Cl$_2$, Ag-AgBr and Ag-AgI and being in the form of a meshed structure, means for applying said predetermined voltage, the value of which is suitable for the selective quantitative analysis of said sample gas, across said operating electrode and said counter electrode so that electrolysis can be carried out due to the contact between said electrolyte and said sample gas in said pores, and means for detecting the quantity of electricity appearing during said electrolysis.

2. A gas flow coulometric detector driven with a predetermined constant voltage comprising a casing filled with an electrolyte; means for defining a sample gas passage within said casing; means for flowing a sample gas through said passage, said means for defining said sample gas passage including a pair of porous operating electrodes in the form of flate sheets disposed opposite to each other in closely spaced parallel relation so as to define said sample gas passage therebetween, each of said porous operating electrodes having a first surface in contact with said sample gas flowing through said passage, a second surface in contact with said electrolyte, and many pores providing communication means between said two surfaces, said porous operating electrodes having the property that they inhibit undesirable permeation of said electrolyte from said second surfaces to said first surfaces through said pores; a pair of counter electrodes spaced from and disposed opposite to respective operating electrodes in said casing on the sides of said second surfaces of said operating electrodes so as to be in contact with said electrolyte, said counter electrodes having surfaces parallel to the second surfaces of said respective operating electrodes, means for applying said predetermined voltage, the value of which is suitable for the selective quantitative analysis of said sample gas, across said operating electrodes and said counter electrodes so that electrolysis can be carried out due to the contact between said electrolyte and said sample gas in said pores, and means for detecting the quantity of electricity appearing during said electrolysis.

3. A gas flow coulometric detector as claimed in claim 2, in which said counter electrodes are made of a material selected from the group consisting of Ag-AgCl, Hg-Hg$_2$Cl$_2$, Ag-AgBr and Ag-AgI.

4. A gas flow coulometric detector as claimed in claim 2, in which said counter electrodes are in the form of meshed structure.

5. A gas flow coulometric detector as claimed in claim 2, further comprising means interposed between said operating electrodes and said counter electrodes for preventing interferential metal ions in said electrolyte from reaching said operating electrodes.

6. A gas flow coulometric detector as claimed in claim 5, in which said preventing means is an ion exchange membrane.

7. A gas flow coulometric detector as claimed in claim 5, further comprising means for circulating said electrolyte through said casing.

8. A glas flow coulometric detector as claimed in claim 2, further comprising means for circulating said electrolyte through said casing.

9. A gas flow coulometric detector as claimed in claim 2, in which said casing is provided with an admission port and a discharge port for the supply and discharge of said electrolyte into and out of said casing.

10. A gas flow coulometric detector as claimed in claim 9, in which said counter electrodes are made of a material selected from the group consisting of Ag-AgCl, Hg-Hg$_2$Cl$_2$, Ag-AgBr and Ag-AgI.

11. A gas flow coulometric detector comprising a casing filled with an electrolyte, means for filling said electrolyte into said casing, means for preventing communication of said electrolyte with external air, a sample gas passage, means for flowing a sample gas through said passage, a porous operating electrode in the form of a flat sheet, forming at least one wall of said sample gas passage and having a first surface in contact with said sample gas flowing through said passage, a second surface in contact with said electrolyte, and many pores providing communication means between said two surfaces, said porous operating electrode having the property that it inhibits undesirable permeation of said electrolyte from said second surface to said first surface through said pores, a counter electrode spaced from and disposed opposite to said operating electrode on the side of said second surface of said operating electrode and having a surface in parallel with said second surface so as to be in contact with said electrolyte, said counter electrode being in the form of a fine meshed structure and made from a material selected from the group consisting of Ag-AgCl, Hg-Hg$_2$Cl$_2$, Ag-AgBr and Ag-AgI, means for applying a predetermined constant voltage that is suitable for the selective quantitative analysis of said sample gas across said operating electrode and said counter electrode so that electrolysis can be carried out due to the contact between said electrolyte and said sample gas in said pores, and means for detecting the quantity of electricity appearing during said electrolysis.

12. A gas flow coulometric detector as claimed in claim 11, wherein a pair of said operating electrodes are disposed opposite to each other in closely spaced parallel relation so as to define said sample gas passage therebetween and a pair of said counter electrodes are disposed in bilateral symmetry with respect to said passage.

13. A gas flow coulometric detector comprising a casing filled with an electrolyte, means for removing any residual oxygen dissolved in said electrolyte, means for circulating oxygen-free electrolyte through said casing, means for forming a sample gas passage in said casing, means for flowing a sample gas through said passage, said means for forming said sample gas passage including a porous operating electrode in the form of a flat sheet having a first surface in contact with said sample gas flowing through said passage, a second surface in contact with said electrolyte, and many pores providing communication means between said two surfaces, said porous operating electrode having the property that it inhibits undesirable permeation of said electrolyte from said second surface to said first surface through said pores, a counter electrode spaced from and disposed opposite to said operating electrode on the side of said second surface of said operating electrode, said counter electrode having a surface extending parallel with said second surface and being in contact with said electrolyte, said counter electrode being in the form of a fine meshed structure and made from a material selected from the group consisting of Ag-AgCl, Hg-Hg$_2$Cl$_2$, Ag-AgBr and Ag-AgI, an ion exchange membrane interposed between said operating electrode and said counter electrode for preventing interferential metal ions existing in said electrolyte from reaching said operating electrode, means for applying a predetermined constant voltage that is suitable for selective quantitative analysis of said sample gas across said operating electrode and said counter electrode so that electrolysis can be carried out due to the contact between said electrolyte and said sample gas in said pores, and means for detecting the quantity of electricity appearing during said electrolysis.

14. A gas flow coulometric detector as claimed in claim 13, in which a pair of said operating electrodes are disposed opposite to each other in closely spaced parallel relation so as to define said sample gas passage therebetween and a pair of said counter electrodes are disposed in bilaterial symmetry with respect to said passage within said casing.

15. A gas flow coulometric detector comprising a casing filled with an electrolyte, means for removing anyy residual oxygen dissolved in said electrolyte, means for circulating oxygen-free electrolyte through said casing, means for forming a sample gas passage in said casing, means for flowing a sample gas through said passage, said means for forming said sample gas passage including a porous operating electrode in the form of a flat sheet having a first surface in contact with said sample gas flowing through said passage, a second surface in contact with said electrolyte, and many pores providing communication means between said two surfaces, said porous operating electrode having the property that it inhibits undesirable permeation of said electrolyte from said second surface to said first surface through said pores, a counter electrode spaced from and disposed opposite to said operating electrode on the side of said second surface of said operating electrode, said counter electrode having a surface extending parallel with said second surface and being in contact with said electrolyte, said counter electrode being in the form of a fine meshed structure and made from a material selected from the group consisting of Ag-AgCl, Hg-Hg$_2$Cl$_2$, Ag-AgBr and Ag-AgI, a filler in gel form interposed between said operating electrode and said counter electrode for preventing interferential metal ions existing in said electrolyte from reaching said operating electrode, means for applying a predetermined constant voltage that it suitable for selective quantitative analysis of said sample gas across said operating electrode and said counter electrode so that electrolysis can be carried out due to the contact between said electrolyte and said sample gas in said pores, and means for detecting the quantity of electricity appearing during said electrolysis.

16. A gas flow coulometric detector as claimed in claim 15, in which an ion exchange membrane is disposed between said operating electrode and said counter electrode for preventing interferential metal ions existing in said electrolyte from reaching said operating electrode and being spaced from said operting electrode to define a space wherein said filler is located.

17. A gas flow coulometric detector as claimed in claim 15, in which a pair of said operating electrodes are disposed opposite to each other in closely spaced parallel relation so as to define said sample gas passage therebetween and a pair of said counter electrodes are disposed in bilateral symmetry with respect to said passage within said casing.

18. A gas flow coulometric detector driven with a predetermined constant voltage comprising a casing filled with an electrolyte, a pair of porous operating electrodes in the form of flat sheets disposed opposite to each other in closely spaced parallel relation so as to define a sample gas passage therebetween, means for flowing a sample gas through said passage, each of said porous operating electrodes having a first surface in contact with said sample gas flowing through said passage, a second surface in contact with said electrolyte, and many pores providing communication means between said two surfaces, said porous operating electrodes having the property that they inhibit undesirable permeation of said electrolyte from said second surface to said first surface through said pores, a counter electrode spaced from and disposed opposite to each of said operating electrodes, and means for detecting the quantity of electricity appearing during said electrolysis.

19. A gas flow coulometric detector according to claim 18, wherein each of the counter electrodes is in said casing on the side of the second surface of the respective operating electrodes so as to be in contact with said electrolyte, each counter electrode having a surface parallel to the second surface of the respective operating electrodes, each counter electrode being made of a material selected from the group consisting of Ag-AgCl, Hg-Hg$_2$Cl$_2$, Ag-AgBr and Ag-AgI, said electrolyte being predetermined in accordance with said material of said counter electrode, said detector further including means for applying said predetermined voltage, the value of which is suitable for the selective quantitative analysis of said sample gas, across said operating electrodes and said counter electrodes so that electrolysis can be carried out due to the contact between said electrolyte and said sample gas in said pores.

20. A gas flow coulometric detector driven with a predetermined constant voltage comprising a casing filled with an electrolyte, means for defining a sample gas passage within said casing, means for flowing a sample gas through said passage, said means for defining said sample gas passage including a porous operating electrode having a first surface in contact with said sample gas flowing through said passage, a second surface in contact with said electrolyte, and many pores providing communication means between said two surfaces, said porous operating electrode having the property that it inhibits undesirable permeation of said electrolyte from said second surface to said first surface through said pores, a counter electrode spaced from and disposed opposite to said operating electrode in said casing on the side of said second surface of said operating electrode so as to be in contact with said electrolyte, said counter electrode having a surface parallel to the second surface of said operating electrode, said counter electrode being made of a material selected from the group consisting of Ag-AgCl, Hg-$Hg_2Cl_2$, Ag-AgBr and Ag-AgI, an ion exchange membrane interposed between said operating electrode and said counter electrode for preventing inferential metal ions in said electrolyte from reaching said operating electrode, means for applying said predetermined voltage, the value of which is suitable for the selective quantitative analysis of said sample gas, across said operating electrode and said counter electrode so that electrolysis can be carried out due to the contact between said electrolyte and said sample gas in said pores, and means for detecting the quantity of electricity appearing during said electrolysis.

21. A gas flow coulometric detector as claimed in claim 2, in which said counter electrodes are of porous nature.

* * * * *